United States Patent
Markman et al.

(10) Patent No.: US 9,558,173 B2
(45) Date of Patent: Jan. 31, 2017

(54) METHOD FOR CREATING A DOCUMENT MODEL FROM DISCONTINUOUS SELECTIONS OF AN EXISTING DOCUMENT

(71) Applicants: Kevin Markman, New York, NY (US); Olga Sergeyevna Saviano, New York, NY (US); Luiz Amaral Franca Pereira Filho, Jersey City, NJ (US); Isabella Ip, New York, NY (US)

(72) Inventors: Kevin Markman, New York, NY (US); Olga Sergeyevna Saviano, New York, NY (US); Luiz Amaral Franca Pereira Filho, Jersey City, NJ (US); Isabella Ip, New York, NY (US)

(73) Assignee: Google Inc., Mountain View, CA (US)

( * ) Notice: Subject to any disclaimer, the term of this patent is extended or adjusted under 35 U.S.C. 154(b) by 424 days.

(21) Appl. No.: 13/759,281

(22) Filed: Feb. 5, 2013

(65) Prior Publication Data
US 2015/0193381 A1 Jul. 9, 2015

Related U.S. Application Data

(60) Provisional application No. 61/679,318, filed on Aug. 3, 2012.

(51) Int. Cl.
G06F 17/00 (2006.01)
G06F 17/24 (2006.01)

(52) U.S. Cl.
CPC .......... G06F 17/246 (2013.01); G06F 17/24 (2013.01)

(58) Field of Classification Search
CPC .... G06F 17/245; G06F 17/246; G06F 17/211; G06F 17/227; G06F 17/217; G06F 17/24
USPC .................................. 715/227, 217
See application file for complete search history.

(56) References Cited

U.S. PATENT DOCUMENTS

| | | | |
|---|---|---|---|
| 6,317,750 B1 * | 11/2001 | Tortolani et al. | |
| 6,640,234 B1 * | 10/2003 | Coffen et al. | 715/219 |
| 2007/0033519 A1 * | 2/2007 | Zdenek | G06F 17/215 715/234 |
| 2010/0174980 A1 * | 7/2010 | Mansfield et al. | 715/234 |
| 2011/0202823 A1 * | 8/2011 | Berger | G06F 17/246 715/217 |
| 2013/0290828 A1 * | 10/2013 | Flake et al. | 715/234 |

OTHER PUBLICATIONS

Amy Beauchemin, "Microsoft Excel 2010 Tutorial", Jan. 13, 2011 (source: office.microsoft.com), http://www.goodwin.edu/computer_resources/pdfs/excel_2010_tutorial.pdf.*

* cited by examiner

Primary Examiner — Scott Baderman
Assistant Examiner — Jason Edwards
(74) Attorney, Agent, or Firm — Ropes & Gray LLP

(57) ABSTRACT

Systems and methods of pasting a discontinuous selection from a first document are provided, comprising receiving, at a processor, the discontinuous selection modeling the selection as a data structure, and pasting each of the plurality of portions including contextual formatting for each portion. The discontinuous selection includes a plurality of portions of the first document and the portions are discontinuous. The portions may include one or more cells from a table, and pasting the one or more cells includes pasting at least borders of the cell, a background color of the cell, and text contained in the cell.

18 Claims, 9 Drawing Sheets

METHOD FOR CREATING A DOCUMENT MODEL FROM DISCONTINUOUS SELECTIONS OF AN EXISTING DOCUMENT

CROSS REFERENCE TO RELATED APPLICATIONS

This application claims the benefit under 35 U.S.C. §119 (e) of U.S. Provisional Application No. 61/679,318, filed Aug. 3, 2012, which is incorporated herein by reference in its entirety.

BACKGROUND

Copy and paste functions traditionally involved copying selected text and pasting text in another location. In some applications, discontinuous portions of text, i.e., portions of text from different locations in a single document, may be selected and copied, and pasted into another document or application. However, in traditional applications, discontinuous portions of selected text are simply appended to a text string. The context of the selected text is not copied, and information about the document from which it is pasted is also not copied. Thus, information that may be relevant to the selected portions of text is lost in the copy of the selected portions.

SUMMARY

Systems and methods are provided for copying discontinuous portions of selected text from a document including copying the relevant context of the selected text. In one example, a portion of selected text includes a cell from a table, and the entire cell, including the borders of the cell, the background color, and any other relevant properties, is copied. In another example, a portion of the selected text includes at least a part of an equation, and a relevant portion of the equation, or the entire equation, is copied.

According to one aspect, a method of pasting a discontinuous selection from a first document includes receiving, at a processor, the discontinuous selection, wherein the discontinuous selection includes a plurality of portions of the first document and the portions are discontinuous, modeling the discontinuous selection, at the processor, as a data structure, and pasting each of the plurality of portions including contextual formatting for each portion. The contextual formatting is provided in the data structure.

According to one embodiment, at least one of the plurality of portions includes at least one cell from a table, and pasting the at least one cell from the table includes pasting at least borders of the cell, a background color of the cell, and text contained in the cell. According to another embodiment, at least one of the plurality of portions includes at least a part of an equation, and pasting the at least part of the equation includes pasting selected equation arguments and functions. In on embodiment, receiving the discontinuous selection including the plurality of portions includes receiving at least two of a string of text, a table cell, a part of an equation, and autogenerated text. In another embodiment, pasting comprises pasting each of the plurality of portions in one of the first document and a second document.

According to one embodiment, modeling the selection as the data structure includes modeling the selection as a hierarchical data structure including a root node and a plurality of child nodes, wherein each of the plurality of portions is represented by at least one child node.

In one example, modeling the selection further includes storing metadata about the first document in the root node. In another example, at least one of the plurality of portions includes at least one cell from a table, and modeling further includes adding a first table node to the hierarchical data structure, configured to represent information about the table, and adding at least one second table node to the hierarchical data structure, wherein the second table node is a child of the first table node and is configured to include information about the at least one cell. According to one embodiment, adding the first table node includes adding information about properties of the table to the first table node. According to another embodiment, the at least one second table node includes information about properties of a row from which the at least one cell was selected, and modeling further includes adding at least one third table node to the hierarchical data structure, wherein the third table node is a child of the at least one second table node and is configured to represent information about a first cell in the row.

In another example, at least one of the plurality of portions includes at least a part of an equation, and modeling further includes adding a first equation node to the hierarchical data structure, configured to represent information about the at least part of the equation, and adding at least one second equation node to the hierarchical data structure, wherein the second equation node is a child of the first equation node and is configured to include at least one of a function and an argument from the at least part of the equation.

According to one aspect, a system for pasting a discontinuous selection from a first document, includes a processor configured to receive the discontinuous selection, wherein the discontinuous selection includes a plurality of portions of the first document and the portions are discontinuous, and paste each of the plurality of portions including contextual formatting for each portion. The contextual formatting is provided by modeling, at a processor, portions of the discontinuous selection.

According to one embodiment, at least one of the plurality of portions includes at least one cell from a table, and the processor is configured to paste the at least one cell from the table, including borders of the cell, a background color of the cell, and text contained in the cell. According to another embodiment, at least one of the plurality of portions includes at least a part of an equation, and the processor is configured to paste the at least part of the equation including selected equation arguments and functions. According to a further embodiment, the plurality of portions includes at least two of a string of text, a table cell, a part of an equation, and autogenerated text.

In one embodiment, the processor is further configured to model the selection as a hierarchical data structure including a root node and a plurality of child nodes, wherein each of the plurality of portions is represented by at least one child node. In one example, at least one of the plurality of portions includes at least one cell from a table, and, in modeling the selection, the processor is configured to add a first table node to the hierarchical data structure, configured to represent information about the table, and add at least one second table node to the hierarchical data structure, wherein the second table node is a child of the first table node and is configured to include information about the at least one cell. In another example, at least one of the plurality of portions includes at least a part of an equation, and in modeling the selection, the processor is configured to add a first equation node to the hierarchical data structure, configured to represent information about the at least part of the equation, and add at least one second equation node to the hierarchical data structure, wherein the second equation node is a child of the first equation node and is configured to include at least one of a function and an argument from the at least part of the equation.

BRIEF DESCRIPTION OF THE FIGURES

The above and other advantages of the disclosure will be apparent upon consideration of the following detailed description, taken in conjunction with the accompanying drawings, in which like reference characters refer to like parts throughout, and in which.

DETAILED DESCRIPTION

Systems and methods are provided for facilitating copying and pasting of discontinuous selections by creating a model of a document slice, or a portion of a document, that represents the discontinuous selection from the document. A discontinuous selection can be any selected portions of a document that are not continuous, for example, selections of portions of documents from various locations in the document. In some applications, discontinuous selections may be made by selecting elements of the document, then pressing a control key, and then selecting another element of the document. The model of the document slice may use a hierarchical data structure or tree to represent the discontinuous selection. The model can be used to represent plain text, tables, parts of tables, equations, parts of equations, images and other document features. Using the model, selected discontinuous portions of a document can be copied, including both the text of each portion and contextual formatting, such as the borders and background colors of a selected cell in a table.

Figure 1A:
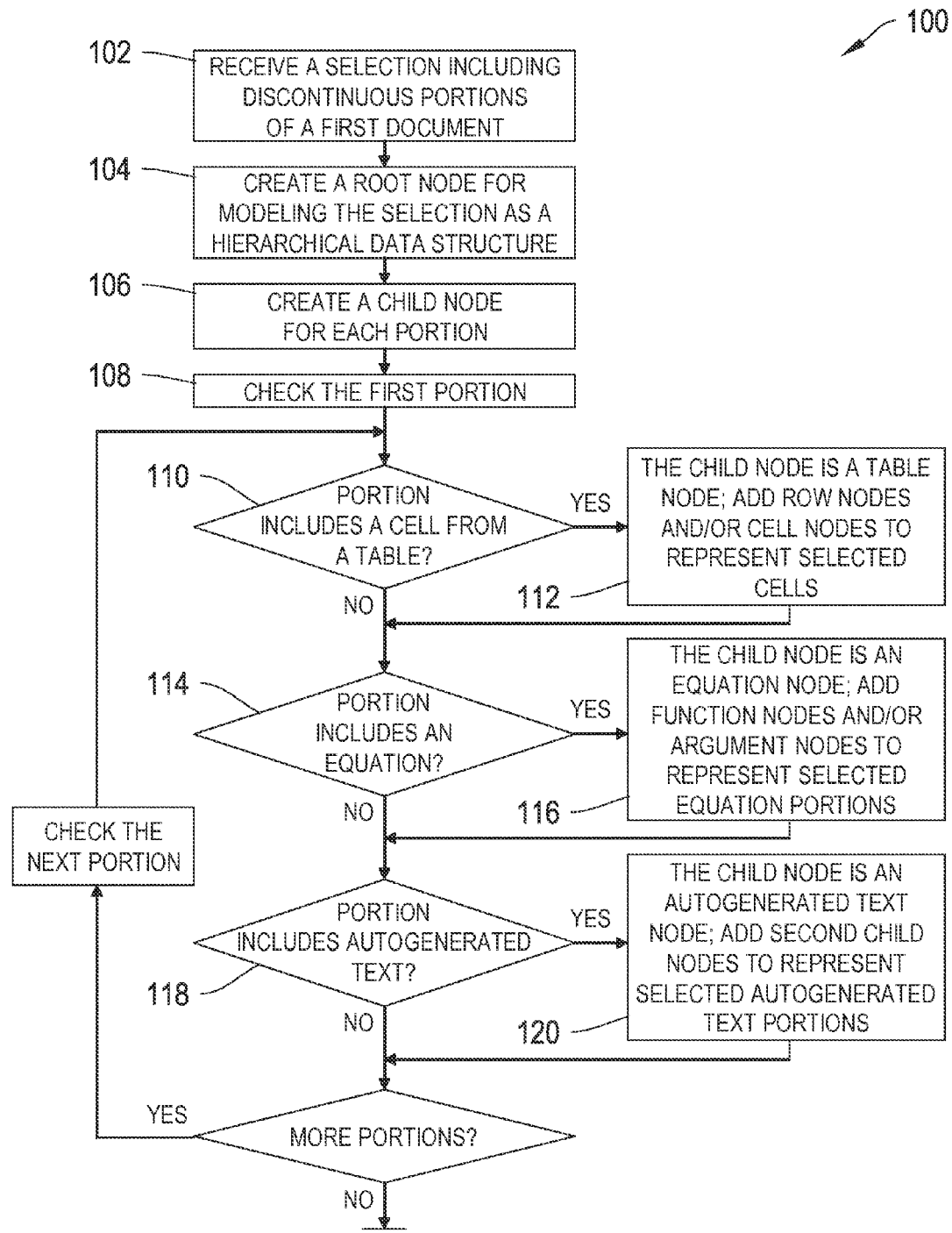
FIG. 1A shows a flow chart of a method for creating a model of selections from a document, according to one embodiment.

A model may be created using the steps shown in FIG. 1A. FIG. 1A shows a flow chart of a method 100 for creating a model of selections from a document. At step 102, a selection is received, including discontinuous portions of a first document. In one example, a user selects various, discontinuous portions of a document, and uses an application's "copy" function to copy the selection. The selection may be copied by a processor, and it may be stored in a memory. At step 104, a root node is created for modeling the selection as a hierarchical data structure. In one example, the hierarchical data structure is created as the selection is copied, and the data structure is stored in a memory. The root node may include information about the first document, such as metadata. It may include, for example, the author, the document name, page background color, page size, the time and date the document was created, times and dates the document was revised. At step 106, a child node is created for each discontinuous portion of the selection. In one example, a processor iterates through the selection, creating a child node for each portion of the selection, thereby generating a sparse tree representation of the selection. For each portion (or node) the processor then iterates through the rest of the method 100, including at least steps 110, 114, 118, and 122. The first portion in the selection is checked first, at step 108.

At step 110, the selection is checked to determine whether any portions include a cell from a table. If a portion includes a cell from a table, the method proceeds to step 112. The child node for the portion that includes a cell from a table becomes a table node. If the portion includes an entire table, then the entire table is represented in the child table node for that portion. If the portion includes part of a table, the child node for that portion is a table node, which includes generic information about the table, and may include metadata about the table. Additional row and/or cell nodes may be added to represent the selected cells in the portion as described in greater detail below with reference to FIGS. 2A, 2B and 3.

At step 110, if no portions include a cell from a table, the method 100 proceeds to step 114. If, at step 110, a portion includes a cell from a table, the method 100 proceeds to step 112 as described above, and then proceeds to step 114. At step 114, the selection is checked to determine whether any portions include an equation. If a portion includes an equation, the method 100 proceeds to step 116. The child node representing the portion that includes an equation becomes an equation node. If the portion includes an entire equation, then the entire equation is represented in the respective equation node for that portion. If the portion includes part of an equation, at step 116, the equation node includes generic information about the equation, and it may include metadata about the equation, and one or more function and/or argument nodes are added as children to the equation node, as described in greater detail below with reference to FIG. 4.

At step 114, if no portions include an equation, or part of an equation, the method 100 proceeds to step 118. If, at step 114, a portion includes a part of an equation, the method 100 proceeds to step 116, as described above, and then proceeds to step 118. At step 118, the selection is checked to determine whether any portions include autogenerated document regions, such as the table of contents. If a portion includes autogenerated document regions, at step 120, the child node for the portion is an autogenerated text node, and secondary child nodes may be added to represent selected autogenerated text parts. If a portion includes the entire autogenerated region, then it will copied as a unit and it can be included in one child autogenerated text node. If the portion includes a part of the autogenerated region, additional secondary child nodes may be created as padding, to balance the portion. Padding may be used, for example, if a portion of a selection includes the start of an autogenerated region, and not the end of the autogenerated region. In this example, the start includes a start marker, which was included in the selected portion, and an end marker is added to the modeled representation of the portion as padding.

After checking a portion in the selection, the method 100 proceeds to step 122 to determine if there are any more portions in the selection. If more portions remain, at step 124, the next portion is checked, and the method 100 returns to step 110 to determine if the portion includes a cell from a table.

Figure 1B:
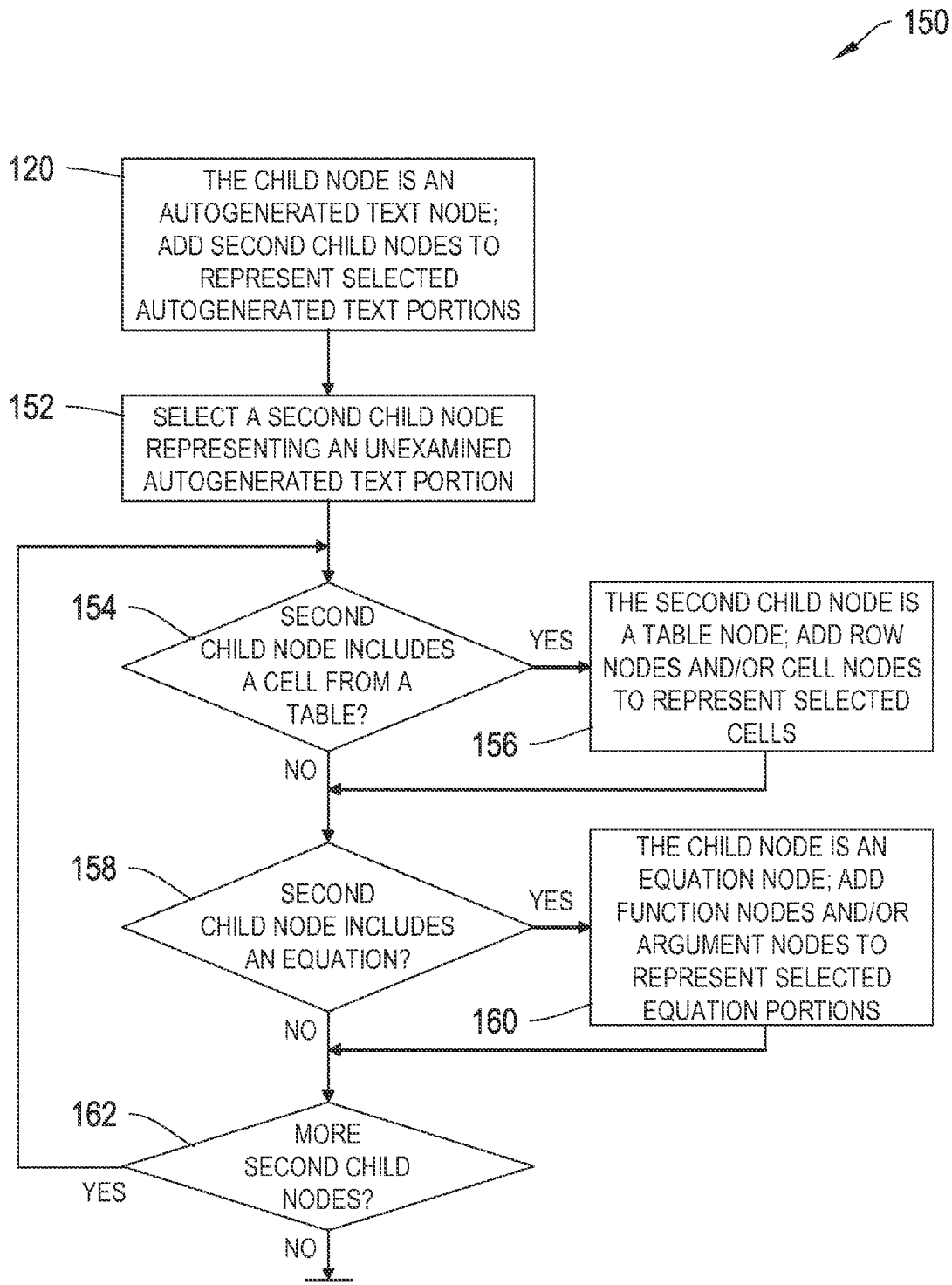
FIG. 1B shows a flow chart of a nested method for creating a part of a model of selections from a document, according to one embodiment.

According to various embodiments, steps 110, 114 and 118 (along with corresponding respective steps 112, 116 and 120) may occur in any order with respect to each other. For example, after step 106, the method 100 may proceed to step 118, then step 110 and then step 114. Furthermore, a selected portion may include, for example, an autogenerated region having a nested table. Thus, in some examples, steps 110, 114 and 118 are repeated for each node that is created, including nested nodes. FIG. 1B shows a flow chart of a nested method 150 for creating a model of an autogenerated region having a nested table and/or equation, according to one embodiment. The method 150 of FIG. 1B begins at step 120 of the method 100 of FIG. 1A. At step 120, second child nodes are added to represent selected autogenerated text portions. Next, at step 152, a second child node representing an unexamined autogenerated text portion is selected. At step 154, the second child node is checked to determine if it includes a cell from a table. If the second child node includes a cell from a table, the method 150 proceeds to step 156, and the second child node is a table node. Row nodes and cell nodes are added to represent selected cells in the table. The method 150 then returns to step 158. If, at step 154, the second child node does not include a cell from a table, the method proceeds directly to step 158.

At step 158, the second child node is checked to determine if it includes an equation. If the second child node includes an equation, it is an equation node, and function nodes and arguments nodes are added to represent selected parts of the equation. The method then returns to step 1162. If, at step 158, the second child node does not include an equation, the method proceeds directly to step 162. At step 162, the autogenerated text node from step 120 is checked to determine if it has any more second child nodes that have not yet been examined.

According to various embodiments, while the illustrative method 150 of FIG. 1B shows the step 120 from the method 100 in FIG. 1A expanded to check for nested tables and equations, the steps 112 and 116 from the method 100 in FIG. 1A may be similarly expanded to check for nested tables, equations and/or autogenerated text. Similarly, the steps 156 and 160 of FIG. 1B may be expanded to check those child nodes for nested tables, equations and/or autogenerated text. According to one embodiment, each portion of selected text is checked and nested hierarchical data structures are created until it is determined that no more tables, equations or autogenerated text regions remain in the portion.

Figure 2A:
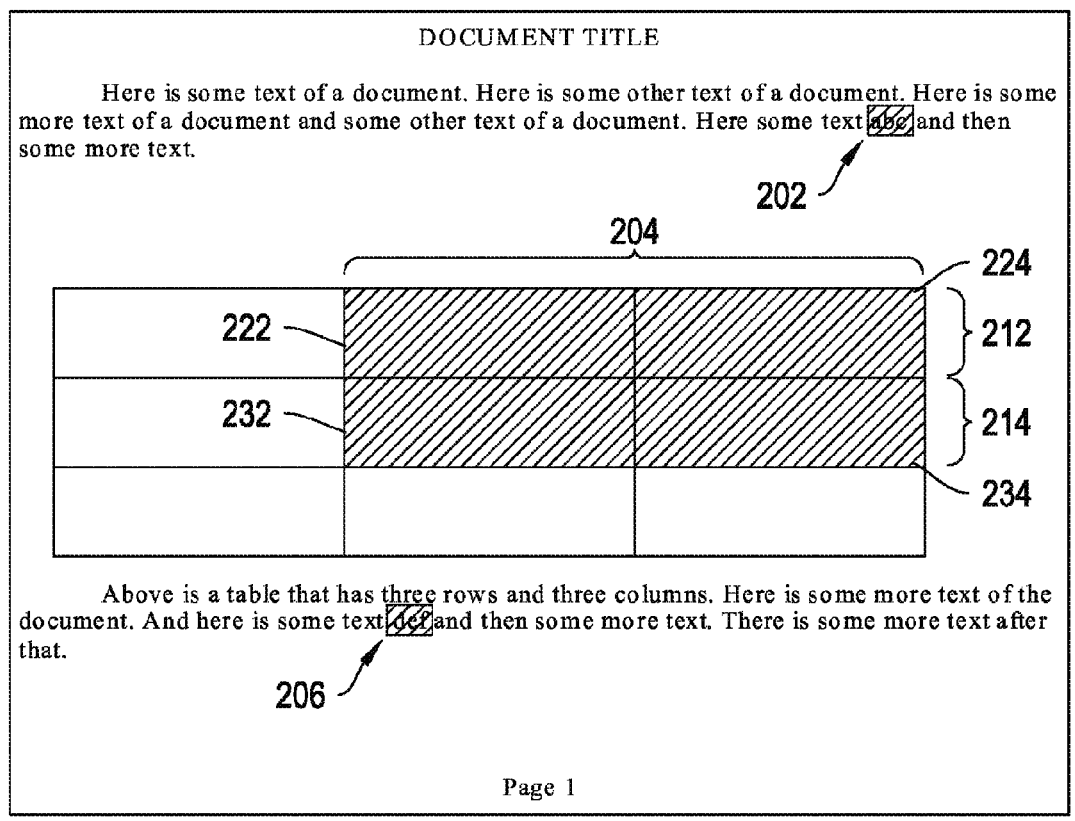
FIG. 2A shows discontinuous selected portions from a first document.

FIG. 2A shows discontinuous selected portions from a first document 200. In particular, the selection includes a first portion 202 of text "abc", a second portion 204 including four table cells 222, 224, 232 and 234, and a third portion 206 of text "def". The second portion 204 includes two cells from a first row 212 and two cells from a second row 214. Note that only some of the cells in rows 212 and 214 are selected.

Figure 2B:
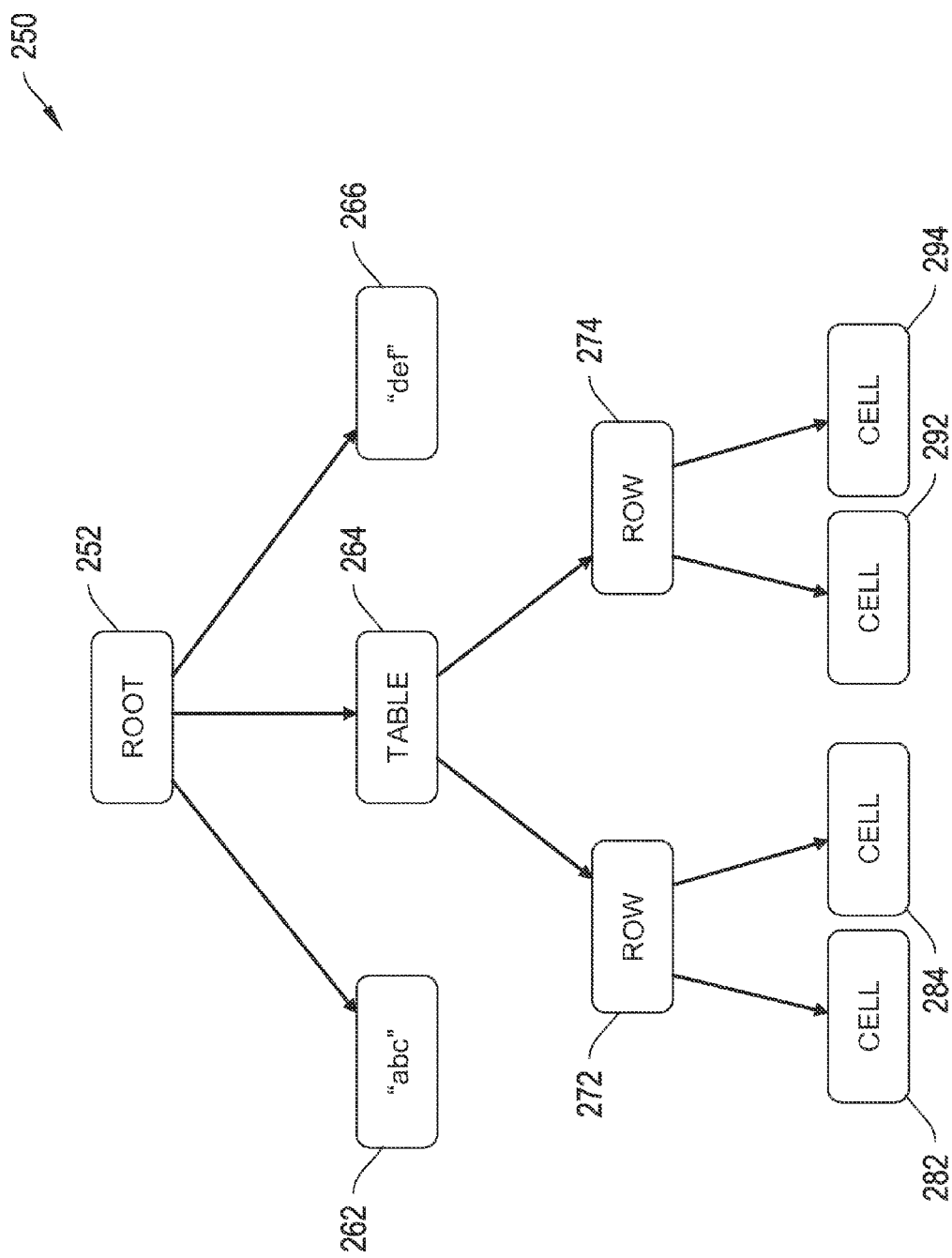
FIG. 2B shows a hierarchical data structure modeling the selected portions of FIG. 2A, according to one embodiment.

FIG. 2B shows a hierarchical data structure 250 modeling the selected portions of FIG. 2A, according to one embodiment. The data structure 250 includes a root node 252, which may include general information or metadata about the first document 200 from which the selection was made. The root node has one child node for each selected portion. In particular, the root node has a first child node 262 representing the first portion 202, a second child node 264 representing the second portion 204, and a third child node 266 representing the third portion 206. Since the first 202 and third 206 portions include only strings of text, the first 262 and third 266 child nodes are leaf nodes (they have no children) and contain the respective selected text. In other embodiments, the first 262 and third 266 child nodes are not leaf nodes, and are each a parent node to a child leaf node. The child leaf node may be an empty string text node. The second portion 204 includes one or more cells from a table, so the second child node 264 is a table node. The table node 264 includes general information about the table, and has additional child nodes to represent the selected portion 204.

The table node 264 has a first child row node 272, representing the first row 212, and a second child row node 274, representing the second row 214. The first 272 and second 274 row nodes include information about the first 212 and second 214 rows. Additionally, the first row node 272 has two child cell nodes, each one representing a selected cell in the first row 212, and the second row node 274 has two child cell nodes, each one representing a selected cell in the second row 214. In particular, the first row node 272 has a first child cell node 282 representing a first cell 222 and a second child cell node 284 representing a second cell 224. The second row node 274 has a third child cell node 292 representing a third cell 232 and a fourth child cell node 294 representing a fourth cell 234. As shown in FIG. 2B, the cell nodes 282, 284, 292 and 294 are leaf nodes, and include the information about each of the respective selected cells 222, 224, 232, 234 in the rows 212 and 214, including any text in each cell as well as contextual formatting such as background colors and border widths. In other embodiments, the cell nodes 282, 284, 292 and 294 are not leaf nodes, and each has a child leaf node. The child leaf nodes may be empty string text nodes.

Figure 3:
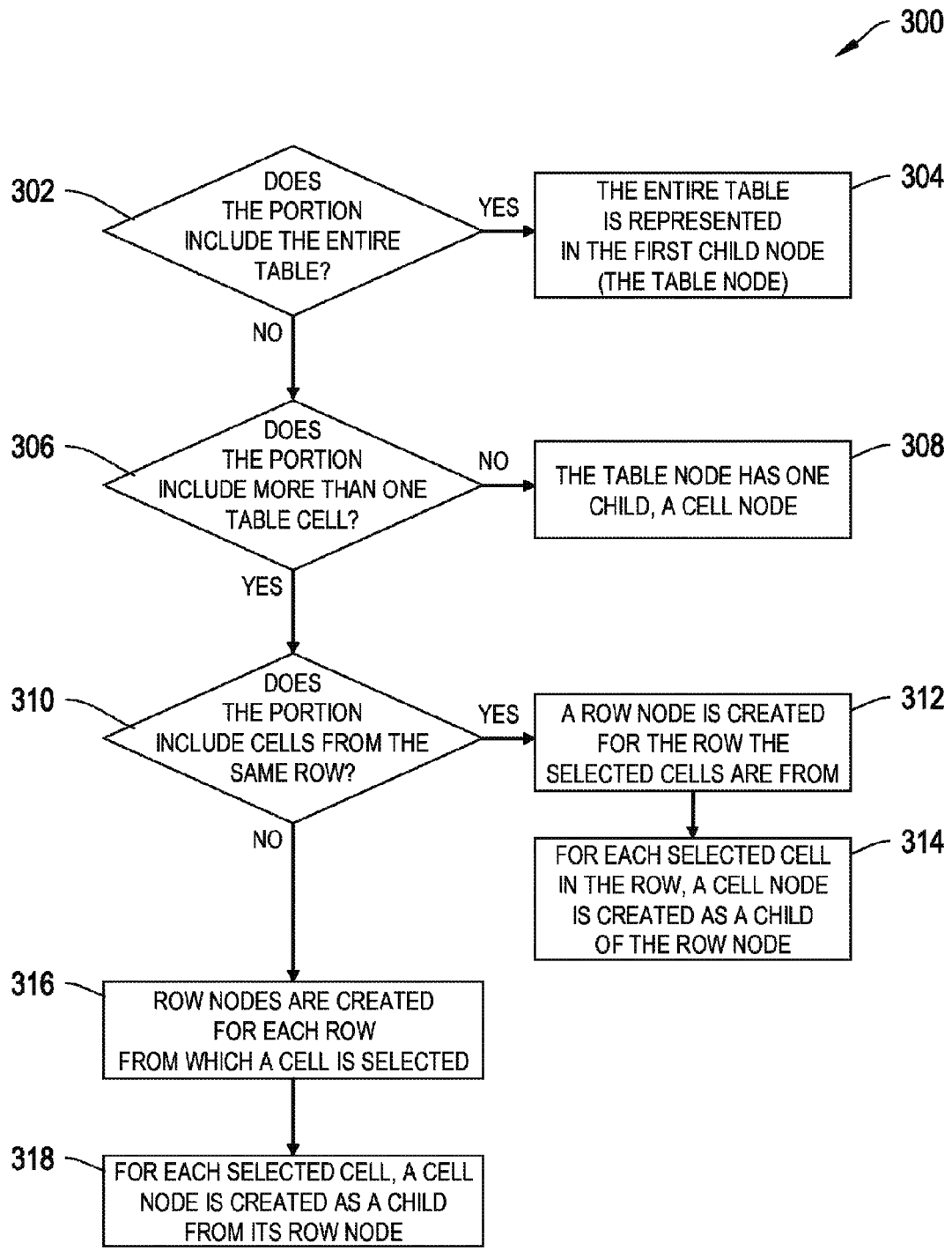
FIG. 3 shows a flow chart of a method for creating a model of selections from a table in a document, according to one embodiment.

FIG. 3 shows a flow chart of a method 300 for creating a model of selection from a table in a document, according to one embodiment. The method 300 may be used to create the sub-tree beginning at table node 264 of the hierarchical data structure 250 shown in FIG. 2B from the selected table in the second portion 204 of the first document 200 of FIG. 2A. At step 302, the portion of the discontinuous selection including the table cell is checked to determine whether it includes an entire table. If the portion includes an entire table, at step 304, the entire table is represented in the first child node, or the table node, and the table node has no child nodes. If the portion does not include an entire table, at step 306, at step 310, the portion is checked to determine if all the selected cells are from the same row. If the selected cells are from a single row in the table, at step 312, a single row node is created to represent the row the selected cells are from. The row node includes information about the row, such as borders, background colors, and the number of columns in the row. The table node may include information about the background colors of the table, and the border lines of the table. At step 314, cell nodes are created for each selected cell in the row, and the cell nodes are children of the row node created at step 312. The cell node includes information about the selected cell, including the selected text. At step 310, if the portion includes cells from different rows, at step 316, row nodes are created for each row node from which a cell is selected. At step 318, for each selected cell, a cell node is created as a child of the row node representing the row of the table the cell was in.

According to one example, extra padding cell nodes may be created to pad the table, such that there will be the same number of cells in each row in the selected portion, and the table will be rectangular. In one example, each row has the same number of child cell nodes but the child cell nodes are from different columns and additional padding cells are created such that the cells remain in different columns when the selected table portion is pasted.

According to one embodiment, after a first table node is created for a first portion of a discontinuous selection, subsequent portions are checked to determine whether the subsequent portions include one or more cells from the same table as the first portion. In one example, a discontinuous selection includes a first portion and a second portion both from the same table. A first table node is created for the first portion, and, after it is determined that the second portion is from the same table, the second portion is added as one or more child nodes from the first table node.

Figure 4:
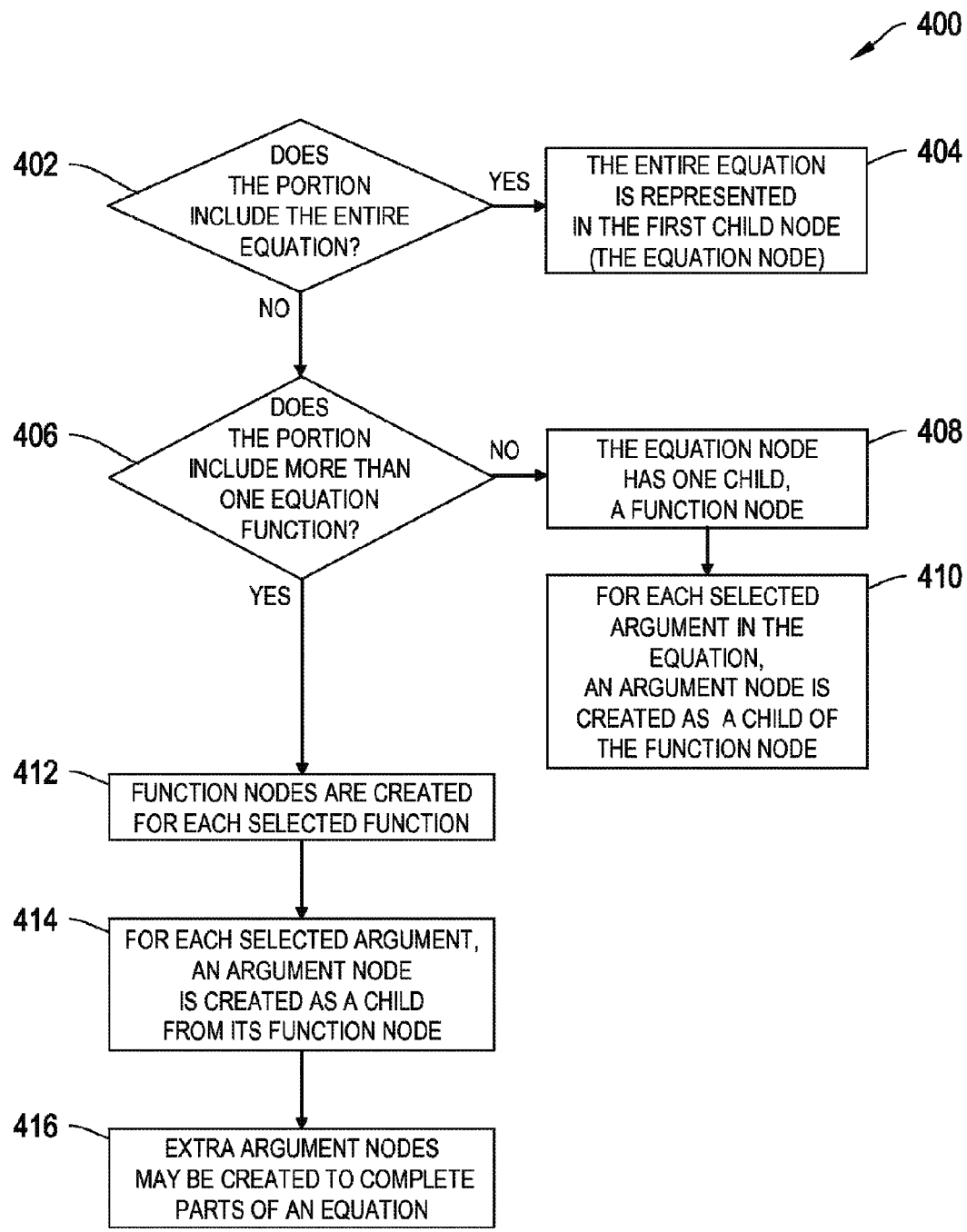
FIG. 4 shows a flow chart of a method for creating a model of selections from an equation in a document, according to one embodiment.

FIG. 4 shows a flow chart of a method 400 for creating a model of selection from an equation in a document, according to one embodiment. At step 402, the portion of a discontinuous selection that includes a part of an equation is checked to determine whether it includes an entire equation. If the portion includes an entire equation, at step 404, the entire equation is represented in the first child node, or the equation node, and the equation node has no child nodes. If the portion does not include an entire equation, at step 406, the portion is checked to determine whether it includes more than one equation function. If the portion includes only one equation function, at step 408, the equation node has one child, a function node representing that function. At step 410, for each selected argument in the portion of the equation, an argument node is created as a child of the function node.

At step 406, if the portion includes more than one equation function, at step 412, function nodes are created for each selected function. The function nodes may be nested (that is, they may be the children of other function nodes) to indicate the structure of the equation and the order in which the functions are performed, as discussed in greater detail with respect to FIG. 5. For each argument included in the portion, at step 414, an argument node is created as a child of its function node.

Figure 5:
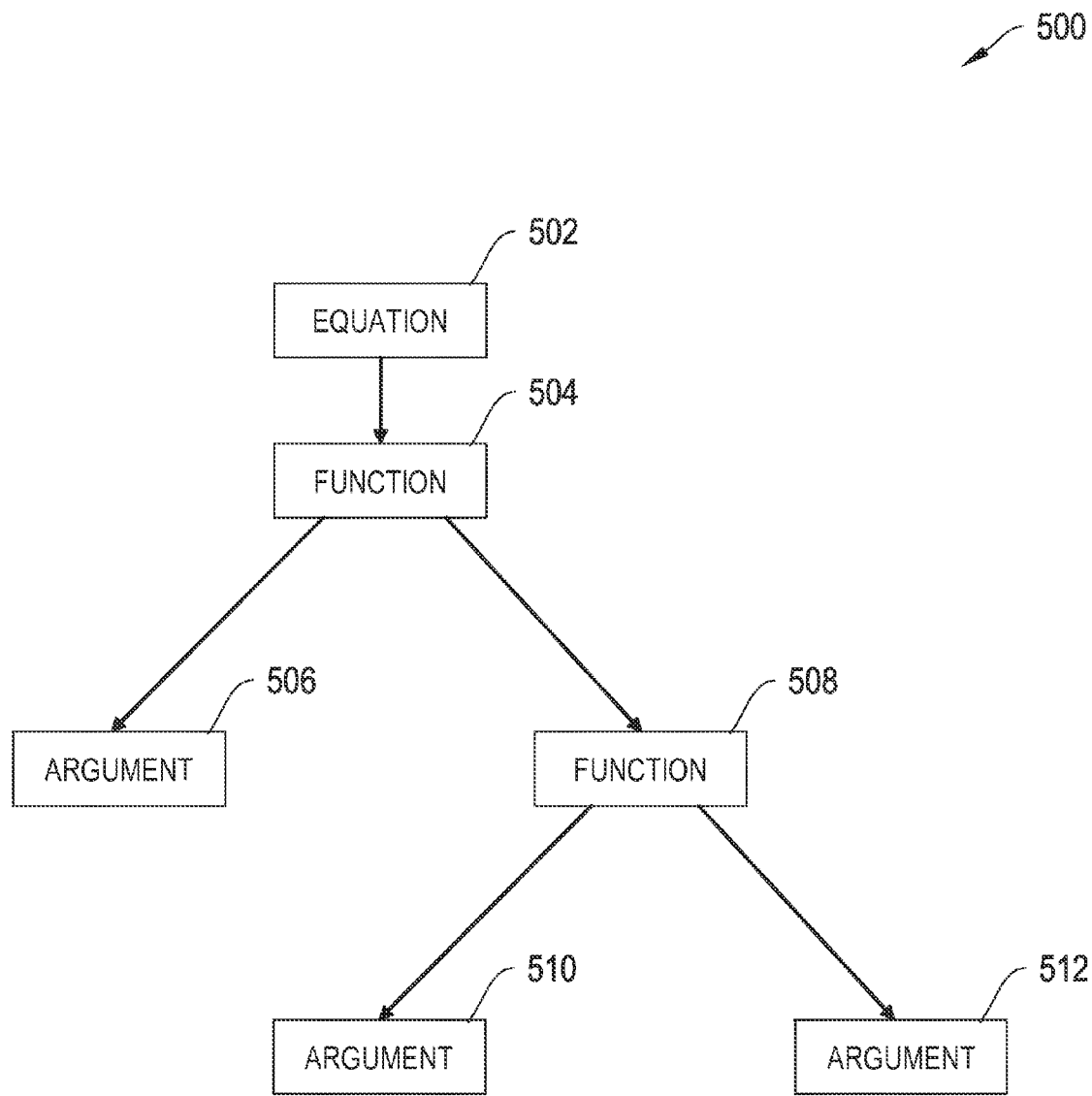
FIG. 5 shows a hierarchical data structure model of an equation, according one embodiment.

FIG. 5 shows hierarchical data structure models of parts of equations, according one embodiment. FIG. 5 shows a hierarchical data structure 500 having a nested function node 508. In particular, in FIG. 5, the equation node 502 has a first child function node 504. The first function node 504 has two children—an argument node 506 and a second child function node 508. The second function node 508 has two children—argument nodes 510 and 512. In one example, the hierarchical data structure 500 may represent a partial equation such as:

$$\frac{A}{B+C}.$$

In one example, the full equation may be:

$$Z*\left(\frac{A}{B+C}\right)-Y,$$

and selected portion includes only $$\frac{A}{B+C}.$$

In order to ensure that the equation is represented accurately, the second function node 508 is nested as a child of the first function node 504. Thus, the first function node 504 represents the "/", the argument node 506 represents "A," and the second function node 508 represents the "+". The argument nodes 510 and 512 represent the arguments "B" and "C," respectively. Using the hierarchical data structure 500, the structure of the partial equation is maintained when it is copied. In one example, if a user selected just the numerator of the division operation without selecting the denominator, the data structure model is padded to include an empty denominator and the equation's end marker. In this manner, the properties of the fraction are maintained (for example, a fraction includes both a numerator and a denominator), even if only part of the equation is selected. In one example, while the data structure model of the partially-selected equation includes nodes for unselected parts of the equation, when the equation is pasted, only the selected portion of the equation is pasted.

In one example, an equation is: Z*(A+B+C)−Y, and the selected portion includes only the part of the equation inside the parentheses. Since "A+B+C" is a simple text string, and are not part of a complex equation, such as a fraction or square root, this selection would be saved as text, and not using an equation node.

In one example, the first equation node may include information about the number of functions in the equation. The second equation nodes include information about the function or functions in the portion, including the selected text. Functions may include, for example, a square root function, a square function, division, multiplication, addition, subtraction, or other functions. According to various embodiments, ranges in different function arguments are represented in different function argument equation nodes, and ranges in different functions are represented in different function nodes (and the children of the function nodes). According to one feature, ranges in different equations are represented in different equation nodes.

According to one embodiment, a marker is added to the beginning and/or end of each portion of a discontinuous selection to indicate where one portion of the selection ends and the next portion begins. In one example, "\n" is added to the beginning of each portion. In another example, "\n" is added to the end of each portion. In other examples, different markers may be used. In some instances, a marker may already be present at the beginning of a portion, and a second marker is not added to the beginning of the portion. Similarly, in some instances, a marker is already present at the end of a portion, and a second marker is not added to the end of the portion. In one embodiment, a start marker is added to the beginning of each portion and an end marker is added to the end of each portion.

According to some embodiments, features of a selected portion may be copied separately from the text of the portion. The features are saved in the node representing the portion. Features may have separate start and end markers. In one example, a first part of a selected portion has a first feature and a second part of a selected portion has a second feature. Start and end markers may be added to the selected portion to indicate where the first feature begins and ends and where the second feature begins and ends. In some instances, start and/or end markers for the features may already be present in the selection. If start and/or end markers are already present in the selection, additional start and/or end markers are not added to the selection. In various examples, features or formatting of the text may include text color, background color, font, type size, and style.

According to one embodiment, the hierarchical data structure is generated by iterating through each selected portion, and processing each portion separately. In one example, selected portions are non-overlapping. Similarly, features of the portions are non-overlapping. For example, if a feature A starts inside a feature B, then it ends inside the feature B. In one example, if a selected portion does not contain any feature start or end markers, the feature is added as a child feature node from the table node. If a portion includes a start marker, then the portion is searched for the end marker. If the portion includes both a start marker and an end marker, then the portion is searched for other start and end markers. If the portion includes a start marker but no end marker, then any features before the start marker are added as child feature nodes from the table node. Then a start marker node corresponding to the start marker is added as a child node from the table node. Any subsequent row or cell markers are processed to add row nodes and cell nodes as described above. The portion is processed recursively, and, in one embodiment, any child nodes representing rows or cells having the features are added to the start marker's node.

According to one embodiment, in constructing the hierarchical data structure representing a portion or document slice, whether a feature marker is included is feature specific and depends on the particular feature. In one embodiment, there is a registry of feature markers. The registry of feature markers is used in determining whether a feature marker is included in a node. In one example, the feature marker included in a first node, as well as the feature markers in each of the child nodes of first node, are used together with the registry to determine whether to emit a new feature node.

According to one embodiment, some features are unique to certain types of document items or classes. For example, a table has unique features, an equation has unique features, and a table of contents has unique features. Each of these class-specific features may be registered as corresponding to its specific class. In one embodiment, each feature class can register itself to be responsible for specific marker nodes corresponding to the class. For example, the Table Feature may register itself as being responsible for table, row, and cell markers.

In one example, in a selection that includes part or all of a table, the table start marker and/or table end marker are included if the marker is already included in the selected portion or if any of its child row markers is included in the selection. Row start markers and row end markers are included if the marker is already included in the selected portion, if any of its child cell markers is included in the selection, or if the parent table markers are included in the selected portion. Cell start markers and cell end markers are included if the marker is already included in the selected portion, or if its parent table marker or parent row marker is included in the selected portion.

According to one example, in a selection that includes part or all of a table of contents, the table of contents start marker will be included if it is already included in the selected portion. Similarly, the table of contents end marker will be included if it is already included in the selected portion. According to another example, in a selection that includes part or all of an equation, both the equation start marker and the equation end marker are included. According to various examples, one or more of argument start markers, argument end markers, argument function start markers, and argument function end markers, may also be included. In some examples, partially selected equations are padded such that they include the same number of arguments as the original equation.

According to one embodiment, features can be registered with a feature registry. In one example, there is a first feature registry for hierarchical data structure generation and a separate second feature registry for document slice generation (or pasting). In some embodiments, one feature registry may be used.

Figure 6:
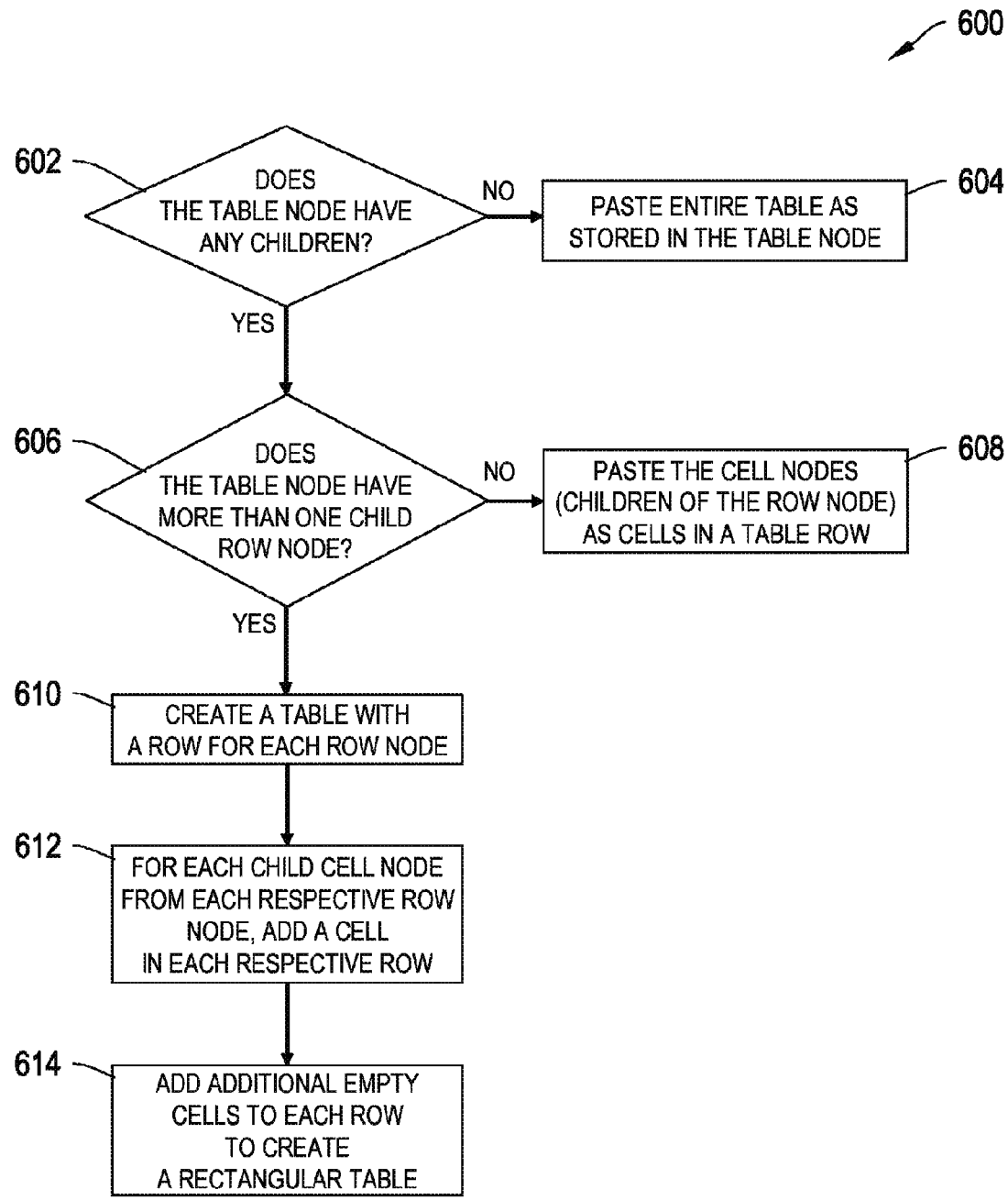
FIG. 6 shows a flow chart of a method of pasting selected table cells, according to one embodiment.

FIG. 6 shows a flow chart of a method 600 of pasting selected table cells in a document, according to one embodiment. The method 600 may be used to paste table cells copied using the methods of FIGS. 1 and 3. In particular, the method 600 is used to paste table cells stored as a hierarchical data structure. At step 602, the table node is checked to determine whether it has any children. If the table node does not have any children, at step 604, the entire table as stored in the table node is pasted in the document. If the table node has children, at step 606, the table node is checked to determine whether it has more than one child row node. If the table node only has one child row node, or if it only has child cell nodes, at step 608, the cell nodes are pasted in the document. The cell nodes are children of a single row node, which is a child of the table node. If the table has more than one child row node, at step 610, a table is created with a row for each row node. At step 612, a cell is created in each row for each respective child cell node. Note that the cell nodes include information about the column from which they were selected in the original table, and cell nodes from different columns in the original table will be in different columns in the newly created table. At step 614, additional empty cells are added to each row such that the new table is rectangular. Thus, if two row nodes each have one child cell node, but the child cells nodes are from different columns, the new table will be a two-by-two table with each pasted cell in a separate row and column, and empty cells in the other column of each row.

In one example, a portion includes one table cell, and is represented by one cell node, which is a child of the table node. In another example, a portion includes two table cells from the same row of the table. A row node is created to represent the row, and two cell nodes are created to represent each cell. The row node is a child of the first table node, and the cell nodes are children of the row node. In a further example, a portion includes two table cells from different rows and different columns of the table. Two row nodes are created, each one representing one row, and two cell nodes are created to represent each cell. Each row node is a child of the first table node, and each cell node is a child of the respective row node which represents the row in which the cell was located. According to one example, if the two cells from the table are pasted into a document, the pasted table will be padded with empty cells such that it is rectangular. According to one feature, the minimum number of empty cells to create a rectangular table will be used. In various embodiments, ranges in different cells are represented in different cells nodes and ranges in different rows are represented in different row nodes (and the children of the row nodes). According to one feature, ranges in different tables are represented in different table nodes.

According to one embodiment, when a document is created, a hierarchical data structure of the entire document is created. The data structure is updated when the document is saved. When portions of the document are selected and copied, the hierarchical data structure of the entire document is traversed, and corresponding parts of the hierarchical data structure are selected and copied into a new data structure representing just the selected portions. In another embodiment, a hierarchical data structure is created just for tables, equations, tables of contents, other autogenerated text, and other predetermined parts of a document when these document items are created. When portions of the document are selected and copied, the pre-existing hierarchical data structures are used to generate a data structure of the copied portions. In one embodiment, an HTML generator is used to generate and paste selected portions including HTML.

Figure 7:
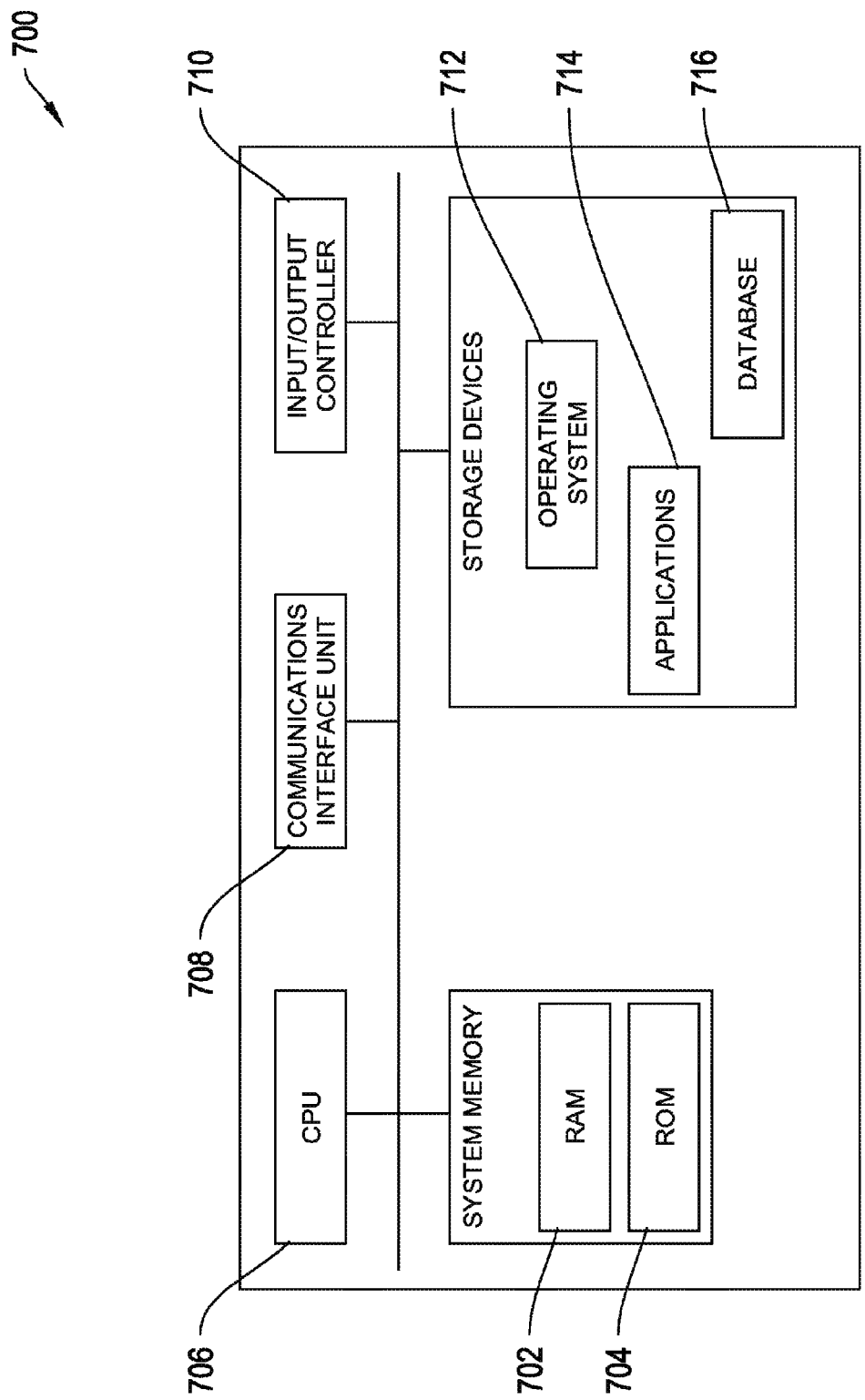
FIG. 7 is a block diagram of a computing device for performing any of the processes described herein.

FIG. 7 is a block diagram of a computing device for performing any of the processes described herein. Each of the components of these systems may be implemented on one or more computing devices 700. In certain aspects, a plurality of the components of these systems may be included within one computing device 700. In certain implementations, a component and a storage device may be implemented across several computing devices 700.

The computing device 700 comprises at least one communications interface unit, an input/output controller 710, system memory, and one or more data storage devices. The system memory includes at least one random access memory (RAM 702) and at least one read-only memory (ROM 704). All of these elements are in communication with a central processing unit (CPU 706) to facilitate the operation of the computing device 700. The computing device 700 may be configured in many different ways. For example, the computing device 700 may be a conventional standalone computer or alternatively, the functions of computing device 700 may be distributed across multiple computer systems and architectures. In FIG. 7, the computing device 700 is linked, via network or local network, to other servers or systems.

The computing device 700 may be configured in a distributed architecture, wherein databases and processors are housed in separate units or locations. Some units perform primary processing functions and contain at a minimum a general controller or a processor and a system memory. In distributed architecture implementations, each of these units may be attached via the communications interface unit 708 to a communications hub or port (not shown) that serves as a primary communication link with other servers, client or user computers and other related devices. The communications hub or port may have minimal processing capability itself, serving primarily as a communications router. A variety of communications protocols may be part of the system, including, but not limited to: Ethernet, SAP, SAS™, ATP, BLUETOOTH™, GSM and TCP/IP.

The CPU 706 comprises a processor, such as one or more conventional microprocessors and one or more supplementary co-processors such as math co-processors for offloading workload from the CPU 706. The CPU 706 is in communication with the communications interface unit 708 and the input/output controller 710, through which the CPU 706 communicates with other devices such as other servers, user terminals, or devices. The communications interface unit 708 and the input/output controller 710 may include multiple communication channels for simultaneous communication with, for example, other processors, servers or client terminals.

The CPU 706 is also in communication with the data storage device. The data storage device may comprise an appropriate combination of magnetic, optical or semiconductor memory, and may include, for example, RAM 702, ROM 704, flash drive, an optical disc such as a compact disc or a hard disk or drive. The CPU 706 and the data storage device each may be, for example, located entirely within a single computer or other computing device; or connected to each other by a communication medium, such as a USB port, serial port cable, a coaxial cable, an Ethernet cable, a telephone line, a radio frequency transceiver or other similar wireless or wired medium or combination of the foregoing.

For example, the CPU 706 may be connected to the data storage device via the communications interface unit 708. The CPU 706 may be configured to perform one or more particular processing functions. The data storage device may store, for example, (i) an operating system 712 for the computing device 700; (ii) one or more applications 714 (e.g., computer program code or a computer program product) adapted to direct the CPU 706 in accordance with the systems and methods described here, and particularly in accordance with the processes described with regard to the CPU 706; or (iii) database(s) 716 adapted to store information that may be utilized to store information required by the program.

The operating system 712 and applications 714 may be stored, for example, in a compressed, an uncompiled and an encrypted format, and may include computer program code. The instructions of the program may be read into a main memory of the processor from a computer-readable medium other than the data storage device, such as from the ROM 704 or from the RAM 702. While execution of sequences of instructions in the program causes the CPU 706 to perform the process steps described herein, hard-wired circuitry may be used in place of, or in combination with, software instructions for implementation of the processes of the present disclosure. Thus, the systems and methods described are not limited to any specific combination of hardware and software.

Suitable computer program code may be provided for performing one or more functions in relation selecting, copying, modeling, and/or pasting as described herein. The program also may include program elements such as an operating system 712, a database management system and "device drivers" that allow the processor to interface with computer peripheral devices (e.g., a video display, a keyboard, a computer mouse, etc.) via the input/output controller 710.

The term "computer-readable medium" as used herein refers to any non-transitory medium that provides or participates in providing instructions to the processor of the computing device 700 (or any other processor of a device described herein) for execution. Such a medium may take many forms, including but not limited to, non-volatile media and volatile media. Nonvolatile media include, for example, optical, magnetic, or opto-magnetic disks, or integrated circuit memory, such as flash memory. Volatile media include dynamic random access memory (DRAM), which typically constitutes the main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM or EEPROM (electronically erasable programmable read-only memory), a FLASH-EEPROM, any other memory chip or cartridge, or any other non-transitory medium from which a computer can read.

Various forms of computer readable media may be involved in carrying one or more sequences of one or more instructions to the CPU 706 (or any other processor of a device described herein) for execution. For example, the instructions may initially be borne on a magnetic disk of a remote computer (not shown). The remote computer can load the instructions into its dynamic memory and send the instructions over an Ethernet connection, cable line, or even telephone line using a modem. A communications device local to a computing device 700 (e.g., a server) can receive the data on the respective communications line and place the data on a system bus for the processor. The system bus carries the data to main memory, from which the processor retrieves and executes the instructions. The instructions received by main memory may optionally be stored in memory either before or after execution by the processor. In addition, instructions may be received via a communication port as electrical, electromagnetic or optical signals, which are exemplary forms of wireless communications or data streams that carry various types of information.

Variations, modifications, and other implementations of what is described may be employed without departing from the spirit and scope of the invention. More specifically, any of the method, system, and device features described above or incorporated by reference may be combined with any other suitable method, system or device features disclosed herein or incorporated by reference, and is within the scope of the contemplated inventions. The systems and methods may be embodied in other specific forms without departing from the spirit or essential characteristics thereof. The foregoing embodiments are therefore to be considered in all respects illustrative, rather than limiting of the invention. The teachings of all references cited herein are hereby incorporated by reference in their entirety.

We claim:

1. A method of pasting a discontinuous selection from a first document, comprising:
   retrieving a first document having a segment representing an equation, wherein the equation includes a first logical operation and a second logical operation;
   receiving, at a processor, the discontinuous selection, wherein the discontinuous selection includes a plurality of portions of the first document and the portions are discontinuous, wherein at least one of the plurality of portions includes at least a part of an equation;
   modeling the at least one of the plurality of portions, at the processor, as a hierarchical data structure by:
      adding a first equation node to the hierarchical data structure, configured to represent information about the at least part of the equation,
      adding at least one second equation node to the hierarchical data structure,
      wherein the second equation node is a child of the first equation node and is configured to include a function node and an argument node representing a logical function on an argument from the at least part of the equation; and
   pasting each of the plurality of portions to a new place including information of contextual formatting and the hierarchical data structure for each portion;
   wherein the pasted plurality of portions have one or more empty padding elements that create space between the pasted plurality portions to reflect the discontinuous selection; and
   associating an empty value with one of the one or more empty padding elements to maintain the hierarchical data structure when the one of the one or more empty padding elements represents the argument from the at least part of the equation.

2. The method of claim 1, wherein at least one of the plurality of portions includes at least one cell from a table, and wherein pasting the at least one cell from the table includes pasting at least borders of the cell, a background color of the cell, and text contained in the cell.

3. The method of claim 1, wherein at least one of the plurality of portions includes at least a part of an equation, and wherein pasting the at least part of the equation includes pasting selected equation arguments and functions.

4. The method of claim 1, wherein receiving the discontinuous selection including the plurality of portions includes receiving at least two of a string of text, a table cell, a part of an equation, and autogenerated text.

5. The method of claim 1, wherein pasting comprises pasting each of the plurality of portions in one of the first document and a second document.

6. The method of claim 1, wherein modeling the selection as the data structure includes modeling the selection as a hierarchical data structure including a root node and a plurality of child nodes, wherein each of the plurality of portions is represented by at least one child node.

7. The method of claim 6, wherein modeling the selection further comprises storing metadata about the first document in the root node.

8. The method of claim 6, wherein at least one of the plurality of portions includes at least one cell from a table, and wherein modeling further comprises:
   adding a first table node to the hierarchical data structure, configured to represent information about the table; and
   adding at least one second table node to the hierarchical data structure, wherein the second table node is a child of the first table node and is configured to include information about the at least one cell.

9. The method of claim 8, wherein adding the first table node includes adding information about properties of the table to the first table node.

10. The method of claim 8, wherein the at least one second table node includes information about properties of a row from which the at least one cell was selected, and wherein modeling further comprises:
    adding at least one third table node to the hierarchical data structure, wherein the third table node is a child of the at least one second table node and is configured to represent information about a first cell in the row.

11. The method of claim 1, wherein the data structure model includes an empty element to preserve the logical function of the equation when the at least part of the equation selected by a user does not include every element of the equation.

12. A system for pasting a discontinuous selection from a first document, comprising:
    a processor configured to:
    receive the discontinuous selection, wherein the discontinuous selection includes a plurality of portions of the first document and the portions are discontinuous, wherein at least one of the plurality of portions includes at least a part of an equation;
    model the discontinuous selection, at the processor, as a hierarchical data structure;
    add a first equation node to the hierarchical data structure, configured to represent information about the at least part of the equation;
    add at least one second equation node to the hierarchical data structure, wherein the second equation node is a child of the first equation node and is configured to include a function node and an argument node representing a logical function on an argument from the at least part of the equation; and
    paste each of the plurality of portions to a new place including information of contextual formatting and the hierarchical data structure for each portion;
    wherein the pasted plurality of portions have one or more empty padding elements that create space between the pasted plurality portions to reflect the discontinuous selection; and associate an empty value with one of the one or more empty padding elements to maintain the hierarchical data structure when the one of the one or more empty padding elements represents the argument from the at least part of the equation.

13. The system of claim 12, wherein at least one of the plurality of portions includes at least one cell from a table, and wherein the processor is configured to paste the at least one cell from the table, including borders of the cell, a background color of the cell, and text contained in the cell.

14. The system of claim 12, wherein at least one of the plurality of portions includes at least a part of an equation, and wherein the processor is configured to paste the at least part of the equation including selected equation arguments and functions.

15. The system of claim 12, wherein the plurality of portions includes at least two of a string of text, a table cell, a part of an equation, and autogenerated text.

16. The system of claim 12, wherein the processor is further configured to model the selection as a hierarchical data structure including a root node and a plurality of child nodes, wherein each of the plurality of portions is represented by at least one child node.

17. The system of claim 16, wherein at least one of the plurality of portions includes at least one cell from a table, and wherein, in modeling the selection, the processor is configured to:
  add a first table node to the hierarchical data structure, configured to represent information about the table; and
  add at least one second table node to the hierarchical data structure, wherein the second table node is a child of the first table node and is configured to include information about the at least one cell.

18. The system of claim 12, wherein the data structure model includes an empty element to preserve the logical function of the equation when the at least part of the equation selected by a user does not include every element of the equation.

* * * * *